United States Patent
Hung et al.

(10) Patent No.: US 12,361,692 B2
(45) Date of Patent: Jul. 15, 2025

(54) METHOD AND ELECTRONIC DEVICE FOR MOTION PREDICTION

(71) Applicant: MEDIATEK INC., Hsinchu (TW)

(72) Inventors: Chih-Ming Hung, San Jose, CA (US); Chung-Hung Tsai, Hsinchu (TW); Shao-Hsiang Chang, Hsinchu (TW); Shih-Jung Chuang, Hsinchu (TW); Chun-Nan Li, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 312 days.

(21) Appl. No.: 17/724,008

(22) Filed: Apr. 19, 2022

(65) Prior Publication Data

US 2023/0334838 A1 Oct. 19, 2023

(51) Int. Cl.
  *G01S 13/58* (2006.01)
  *G01S 13/72* (2006.01)
  *G01S 13/86* (2006.01)
  *G06V 10/80* (2022.01)
  *H04N 23/67* (2023.01)
  *H04N 23/68* (2023.01)

(52) U.S. Cl.
  CPC ............ *G06V 10/803* (2022.01); *G01S 13/58* (2013.01); *G01S 13/72* (2013.01); *G01S 13/867* (2013.01); *H04N 23/67* (2023.01); *H04N 23/683* (2023.01)

(58) Field of Classification Search
  None
  See application file for complete search history.

(56) References Cited

U.S. PATENT DOCUMENTS

| 5,850,625 A | * | 12/1998 | Maren ..................... G01S 13/86 |
| | | | 702/179 |
| 11,836,903 B2 | * | 12/2023 | Jia .......................... H04N 23/61 |
| 2010/0157064 A1 | * | 6/2010 | Cheng .............. G08B 13/19645 |
| | | | 348/169 |
| 2018/0318687 A1 | | 11/2018 | Tuxen et al. |
| 2019/0205887 A1 | * | 7/2019 | Kimmel ............. G06F 21/6245 |
| 2020/0272148 A1 | * | 8/2020 | Karasev ................ G01S 13/726 |
| 2021/0397185 A1 | * | 12/2021 | Djuric .................. G05D 1/0088 |
| 2023/0199295 A1 | * | 6/2023 | Jansson ................ H04N 23/675 |
| | | | 348/46 |
| 2023/0311858 A1 | * | 10/2023 | Grewal ................ G01S 13/584 |
| | | | 701/301 |

FOREIGN PATENT DOCUMENTS

| CN | 111462176 A | 7/2020 |
| CN | 114219825 A | 3/2022 |
| TW | I760128 B | 4/2022 |

OTHER PUBLICATIONS

Chinese language office action dated Apr. 27, 2023, issued in application No. TW 111121346.

* cited by examiner

*Primary Examiner* — Sath V Perungavoor
*Assistant Examiner* — Paramita Ghosh
(74) *Attorney, Agent, or Firm* — McClure, Qualey & Rodack, LLP

(57) ABSTRACT

A method for motion prediction includes receiving spatial information output by a radio-wave sensor, wherein the spatial information includes position and velocity of at least one point; receiving an image captured by a camera; tracking at least one object based on the spatial information and the image to obtain a consolidated tracking result; predicting a motion trajectory of the at least one object based on the consolidated tracking result to obtain a prediction result; and controlling the camera according to the prediction result.

16 Claims, 7 Drawing Sheets

METHOD AND ELECTRONIC DEVICE FOR MOTION PREDICTION

CROSS REFERENCE TO RELATED APPLICATIONS

Field of the Disclosure

The present invention is related to a method and an electronic device applying the method, and in particular it is related to a method and an electronic device using a depth sensor and a camera for motion prediction.

DESCRIPTION OF THE RELATED ART

When a person wants to take a photograph or a video with a camera, it is often too late to capture the key moment. When the user snaps the photograph early to capture a series of images, the snapshots may still miss the key moment, due to the camera having limited frames per second (fps). When utilizing image-based algorithms, such as machine learning for classification and recognition to assist object tracking for adaptive snapshots, numerous challenges result in inadequate image/video quality and poor user experience. For example, the challenges may be time lag and high power consumption, hijacking, centralization, drifting, and loss of focus.

Electronic Image Stabilization (EIS) is based on image content detection to track and compensate the camera movement. Similar to the aforementioned imaged-based object tracking (although with different algorithms), there are still challenges that can result in imperfect EIS outcomes. For example, the challenges may be hijacking, time lag, high system power consumption, and loss of effective Field of View (FoV).

BRIEF SUMMARY OF THE DISCLOSURE

In order to resolve the issue described above, the present invention provides a method for motion prediction. The method includes: receiving spatial information output by a radio-wave sensor, wherein the spatial information includes position and velocity of at least one point; receiving an image captured by a camera; tracking at least one object based on the spatial information and the image to obtain a tracking result; predicting a motion trajectory of the at least one object based on the tracking result to obtain a prediction result; and controlling the camera according to the prediction result.

According to the method described above, the spatial information further includes a frame-level confidence indicator.

According to the method described above, the frame-level confidence indicator is determined based on a stability of a signal power level of a reflected wave received by the radio-wave sensor within a frame.

According to the method described above, the step of tracking the at least one object based on the spatial information and the image to obtain the tracking result, includes: processing the image to obtain at least one property of the at least one object in the image; and fusing the spatial information with the at least one property of the at least one object in the image to obtain the tracking result.

According to the method described above, the at least one property of the at least one object in the image is obtained by processing the image using at least one of Artificial Intelligence (AI), Machine Learning (ML) content detection and Computer Vision (CV).

According to the method described above, the step of controlling the camera according to the prediction result, includes: setting at least one of camera parameters and image parameters based on the prediction result; and capturing a final image based on the set camera parameters and the set image parameters.

According to the method described above, the camera parameters include at least one of a shutter timing, a shutter speed and a focal length of the camera based on the prediction result, and the image parameters are dedicated for image processing.

According to the method described above, the step of tracking the at least one object based on the spatial information and the image to obtain the tracking result, includes generating a first tracking result based on the spatial information; generating a second tracking result based on the image; and unifying the first tracking result and the second tracking result to obtain the consolidated tracking result.

According to the method described above, the step of unifying the first tracking result and the second tracking result, includes: setting the weights of the first tracking result and the second tracking result based on at least one of the spatial information and the image; and selecting one of the first and second tracking results with the higher weight as the consolidated tracking result.

The present invention also provides a method for Electronic Image Stabilization (EIS), includes: receiving spatial information output by a radio-wave sensor, wherein the spatial information includes position and velocity of at least one point; receiving an image captured by a camera; determining, based on the spatial information and the image, that motion of the at least one object is local motion if the motion of the at least one object is inconsistent with most other objects; determining, based on the spatial information and the image, that the motion of the at least one object is global motion if the motion of the at least one object is consistent with most other objects; and filtering the global motion for EIS cropping.

The present invention also provides an electronic device. The electronic device includes a radio-wave sensor, a camera, and a processor. The radio-wave sensor is configured to provide spatial information including position and velocity of at least one point. The camera is configured to provide an image. The processor is configured to execute the following steps: receiving the spatial information including the position and velocity of the at least one point; receiving the image captured by the camera; tracking at least one object based on the spatial information and the image to obtain a tracking result; predicting a motion trajectory of the at least one object based on the tracking result to obtain a prediction result; and controlling the camera according to the prediction result.

According to the electronic device above, the spatial information further includes a frame-level confidence indicator; the frame-level confidence indicator is determined based on a stability of a signal power level of a reflected wave received by the radio-wave sensor within a frame.

According to the electronic device above, the processor is configured to track the at least one object based on the spatial information and the image to obtain the tracking result, including: processing the image to obtain at least one property of the at least one object in the image; and fusing the spatial information with the at least one property of the at least one object in the image to obtain the tracking result.

According to the electronic device above, the at least one property of the at least one object in the image is obtained by processing the image using at least one of Artificial Intelligence (AI), Machine Learning (ML) content detection and Computer Vision (CV).

According to the electronic device above, the processor is configured to track the at least one object based on the spatial information and the image to obtain the tracking result, including: generating a first tracking result based on the spatial information; generating a second tracking result based on the image; and unifying the first tracking result and the second tracking result to obtain the consolidated tracking result.

According to the electronic device above, the processor is configured to unify the first tracking result and the second tracking result to obtain the tracking result, including: setting weights of the first tracking result and the second tracking result based on at least one of the spatial information and the image; and selecting one of the first and second tracking results with the higher weight as the consolidated tracking result.

According to the electronic device above, the processor is configured to control the camera according to the prediction result, including: setting at least one of camera parameters and image parameters based on the prediction result; and capturing a final image based on the set camera parameters and the set image parameters.

According to the electronic device above, the camera parameters include at least one of a shutter timing, a shutter speed and a focal length of the camera based on the prediction result, and the image parameters are dedicated for image processing.

The present invention also provides an electronic device for EIS cropping. The electronic device includes a radio-wave sensor, a camera and a processor. The radio-wave sensor is configured to provide spatial information including position and velocity of at least one point. The camera is configured to provide an image. The processor is configured to execute the following steps: receiving spatial information output by the radio-wave sensor; receiving the image captured by the camera; determining, based on the spatial information and the image, that motion of at least one object is local motion if the motion of the at least one object is inconsistent with most other objects; determining, based on the spatial information and the image, that the motion of the at least one object is global motion if the motion of the at least one object is consistent with most other objects; and filtering the global motion for EIS cropping.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

Certain words are used to refer to specific elements in the specification and the claims. Those with ordinary knowledge in the technical field should understand that hardware manufacturers may use different terms to refer to the same component. The specification and the claims of the present invention do not use differences in names as a way to distinguish elements, but use differences in functions of elements as a criterion for distinguishing. The "comprise" and "include" mentioned in the entire specification and the claims are open-ended terms, so they should be interpreted as "including but not limited to". "Generally" means that within an acceptable error range, a person with ordinary knowledge in the technical field can solve the technical problem within a certain error range, and basically achieve the technical effect. In addition, the term "coupled" herein includes any direct and indirect electrical connection means. Therefore, if it is described in the text that a first device is coupled to a second device, it means that the first device can be directly electrically connected to the second device, or indirectly electrically connected to the second device through other devices or connecting means. The following descriptions are preferred ways to implement the present invention. The purpose is to illustrate the spirit of the present invention and not to limit the scope of protection of the present invention.

The following description is the best embodiment expected of the present invention. These descriptions are used to illustrate the general principles of the present invention and should not be used to limit the present invention. The protection scope of the present invention should be determined on the basis of referring to the scope of the claims of the present invention.

Figure 1:
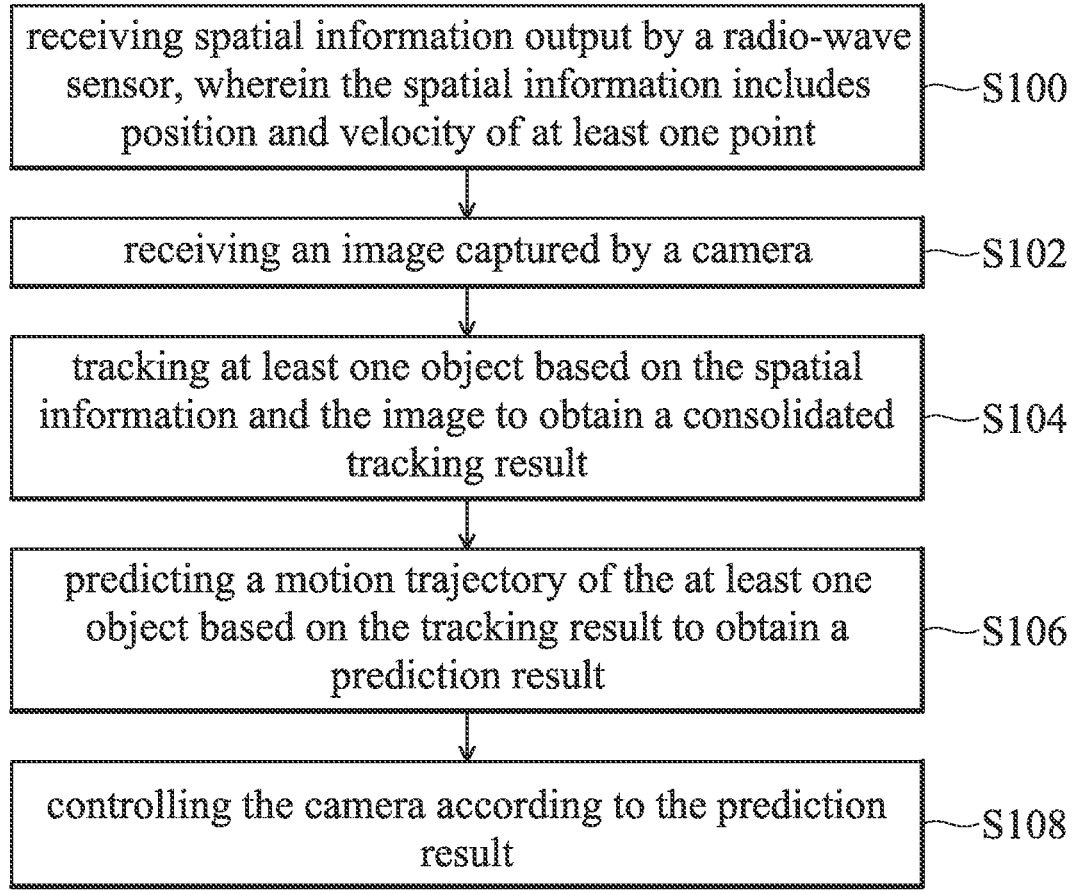
FIG. 1 is a flow chart of a method for motion prediction in accordance with some embodiments of the present invention.

FIG. 1 is a flow chart of a method for motion prediction in accordance with some embodiments of the present invention. As shown in FIG. 1, the method for motion prediction of the present invention includes: receiving spatial information output by a radio-wave sensor, wherein the spatial information includes position and velocity of at least one point (step S100); receiving an image captured by a camera (step S102); tracking at least one object based on the spatial information and the image to obtain a tracking result of each object (step S104); predicting a motion trajectory of each object based on the tracking result to obtain a prediction result of each object (step S106); and controlling the camera according to the prediction result (step S108).

In step S100, the position of the object may be formed by Cartesian coordinates, such as (X, Y, Z), or spherical coordinates, such as $(r, \theta, \psi)$, but the present invention is not limited thereto. In some embodiments, the position and velocity of the object is sent from a radio-wave sensor. The radio-wave sensor may be a radar, especially a millimeter wave radar. The radio-wave sensor may be any types of radar, for example, a pulse radar, a chirp radar, a frequency modulated continuous wave radar, but the present invention is not limited thereto. In some embodiments, the spatial information further includes a frame-level confidence indicator. The frame-level confidence indicator is determined based on the stability of the signal power level of the reflected wave received by the radio-wave sensor within a frame. In some embodiments, the radio-wave sensor of the present invention transmits 32 chirps in each frame. That is, the radio-wave sensor calculates the frame-level confidence indicator in each frame based on the power of the reflected wave in each frame. The higher the frame-level confidence indicator is, the more accurate the position or velocity of the object is.

Specifically, in some embodiments of step S104, the method for motion prediction includes processing the image to obtain at least one property of the object in the image; and fusing the spatial information with the at least one property of the object in the image processing to obtain the tracking result. In some embodiments, the spatial information is formed by a 4-dimensional point cloud, but the present invention is not limited thereto. In some embodiments, the term "point cloud" is a general term. It can mean one signal point, or a group of points. The key and meaning about tracking is across multiple frames. For example, an object is initially located at a first location at a first time point, and moves to a second location at a second time point. The radio-wave sensor detects the object at the first time point to generate a first frame including a group of point cloud at the first location. After that, the radio-wave sensor detects the object at the second time point to generate a second frame including another group of point cloud at the second location. The tracking of the object can be done by calculating moving trajectory of these two groups of point cloud based on the first frame and the second frame (that is across multiple frames). Typically, each point being tracked has a unique ID. One can track a signal point (e.g. ID1) across frames, or multiple points individually and simultaneously (e.g. ID1, ID2, . . . , ID10) across frames. In some embodiments, the 4-dimensional point cloud is constructed by the points representing the position (X, Y, Z) and the velocity of the object. If the spatial information further includes the frame-level confidence indicator, a 5-dimensional point cloud is constructed accordingly. The frame-level confidence indicator may remove the detected objects with low stability of presence. In some embodiments, the method of the present invention which can generate real-time 4D/5D point clouds within the FoV in one frame at a higher frames per second (fps) than that from a typical image sensor. The penetration capability of radio-wave through non-metallic material supports identification of (totally or partially) occluded objects in the 3D space resulting in early prediction.

In step S104, the method for motion prediction uses a tracking algorithm, such as an enhanced Kalman filter with vectored derivatives of the radio-wave sensor to track the object. Processing, by the method of present invention, the 4D/5D point clouds such as the derivative of velocity, windowed filtering, tracking, etc. over time plus signal power and spectral shape to further form up to 7D point cloud may yield transition and trajectory of motion indicating intention of object movement over space and time. In some embodiments, the at least one property of the object in the image is obtained by processing the image using at least one of Artificial Intelligence (AI), Machine Learning (ML) and Computer Vision (CV). In some embodiments, the at least one property of the object in the image may be a scene, a human, a car . . . etc., but the present invention is not limited thereto. In some embodiments, AI (Deep Neural Network: DNN with cognition) is used for scene analysis and semantic segmentation, ML is used for object classification and identification such as recognizing a person, and CV is used for object detection such as detecting a human in a boxed area. In some embodiments, AI and ML are exchangeable.

In some embodiments of step S104, the method for motion prediction includes generating a first tracking result based on the spatial information; generating a second tracking result based on the image; and unifying the first tracking result and the second tracking result to obtain the consolidated tracking result. In some embodiments, the step of unifying the first tracking result and the second tracking result to obtain the consolidated tracking result includes setting weights of the first tracking result and the second tracking result based on at least one of the spatial information and the image; and selecting one of the first and second tracking results with the higher weight as the consolidated tracking result. In some embodiments, the weights of the first tracking result and the second tracking result can be initially set as the same. The weights of the first tracking result and the second tracking result can then be adjusted based on at least one of the spatial information and the image. For example, if the acceleration (derivative of velocity) information from an image is ambiguous or larger than a threshold which is practically impossible in physics, the weight for camera will be decreased. That is, the weight for radio-wave sensor tracking will be increased. Similarly, when a very low light condition is detected exceeding the dynamic range of the image signal processing, radio-wave sensor may be weighted higher. On the other hand, in the case that there is a huge point cloud from the radio-wave sensor and the present invention wants to track one object with a different color in the image, the camera may be weighted higher. In some embodiments, the method of the present invention sets the weights of the first tracking result and the second tracking result based on physics or quality, but the present invention is not limited thereto.

In some embodiments, the method of the present invention further includes a step of selecting the at least one object based on an input signal of an user interface before step S104, or a step of selecting the at least one object based on at least parts of the spatial information (for example, positon, velocity or acceleration) of the at least one object after step S104.

In step S106, the prediction result is used to obtain at least one of camera parameters and image parameters. In some embodiments of step S108, the method for motion prediction includes setting at least one of the camera parameters and the image parameters based on the prediction result; and capturing a final image based on the set camera parameters and the set image parameters. In some embodiments, the camera parameters include at least one of a shutter timing, a shutter speed, and a focal length of the camera. In some embodiments, the image parameters are dedicated for image processing. For example, the image parameters includes the coordinates, the depth distance, the velocity, and the acceleration of the at least one object. The method for motion prediction of the present invention determines the zoom-in, zoom-out, and focus position of the at least one object according to the image parameters. In some embodiments, if the method of present invention would like to capture an image of the moment of jumping of the at least one object, the method of present invention estimates when to capture the image at the highest position, to adjust the time to capture the image, and to adjust the size and the position of the image according to the temporal information (and/or spatial information) of the at least one object in the image.

Figure 2:
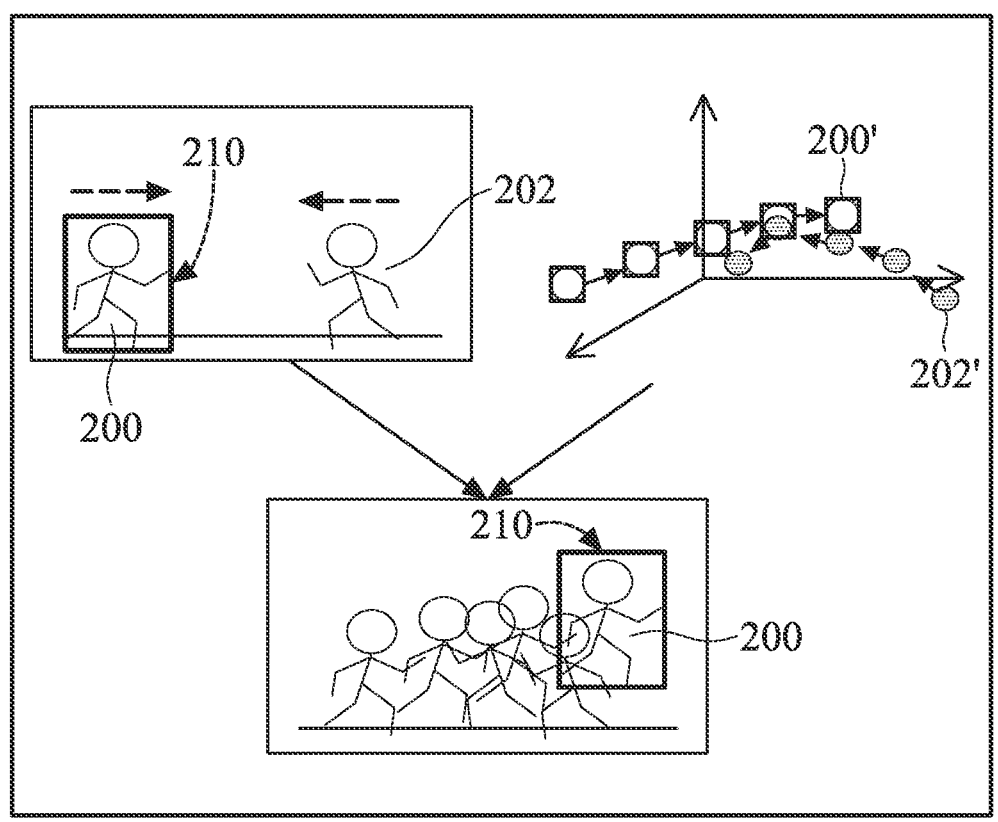
FIG. 2 is a schematic diagram of a first application of the method in FIG. 1 in accordance with some embodiments of the present invention.

FIG. 2 is a schematic diagram of a first application of the method in FIG. 1 in accordance with some embodiments of the present invention. As shown in FIG. 2, an object 200 and an object 202 run to each other face by face. For example, the object 200 runs from the left to the right, and the object 202 runs from the right to the left. In some embodiments, the image with the objects 200 and 202 on the left of FIG. 2 is captured by a camera. Since the method for motion prediction of the present invention is able to track the object 200 based on the image captured by the camera, there is a mark frame 210 marked on the object 200, and the mark frame 210 may be generated by Artificial Intelligence (AI), Machine Learning (ML) content detection or Computer Vision (CV). In some embodiments in FIG. 2, point cloud 200' on the right in FIG. 2 represents the motion trajectory of the object 200 detected by a radio-wave sensor, and point cloud 202' represents the motion trajectory of the object 202 detected by the radio-wave sensor. In some embodiments, the point clouds 200' and 202' are cross-frame point clouds.

When the object 200 and the object 202 overlap in the image captured by the camera, that is, the objects 200 and 202 are totally occluded objects or partially occluded objects, the AI, ML or CV may not identify the object 200 and the object 202 at the same time, that is, the image-based detection has failed. Thus, the weight of the image-tracking result may be decreased. However, the recognition between the object 200 and the object 202 is still available and valid based on the point clouds 200' and 202'. Therefore, the method of present invention can still correctly track the object 200 according to the point cloud 200'.

Figure 3A:
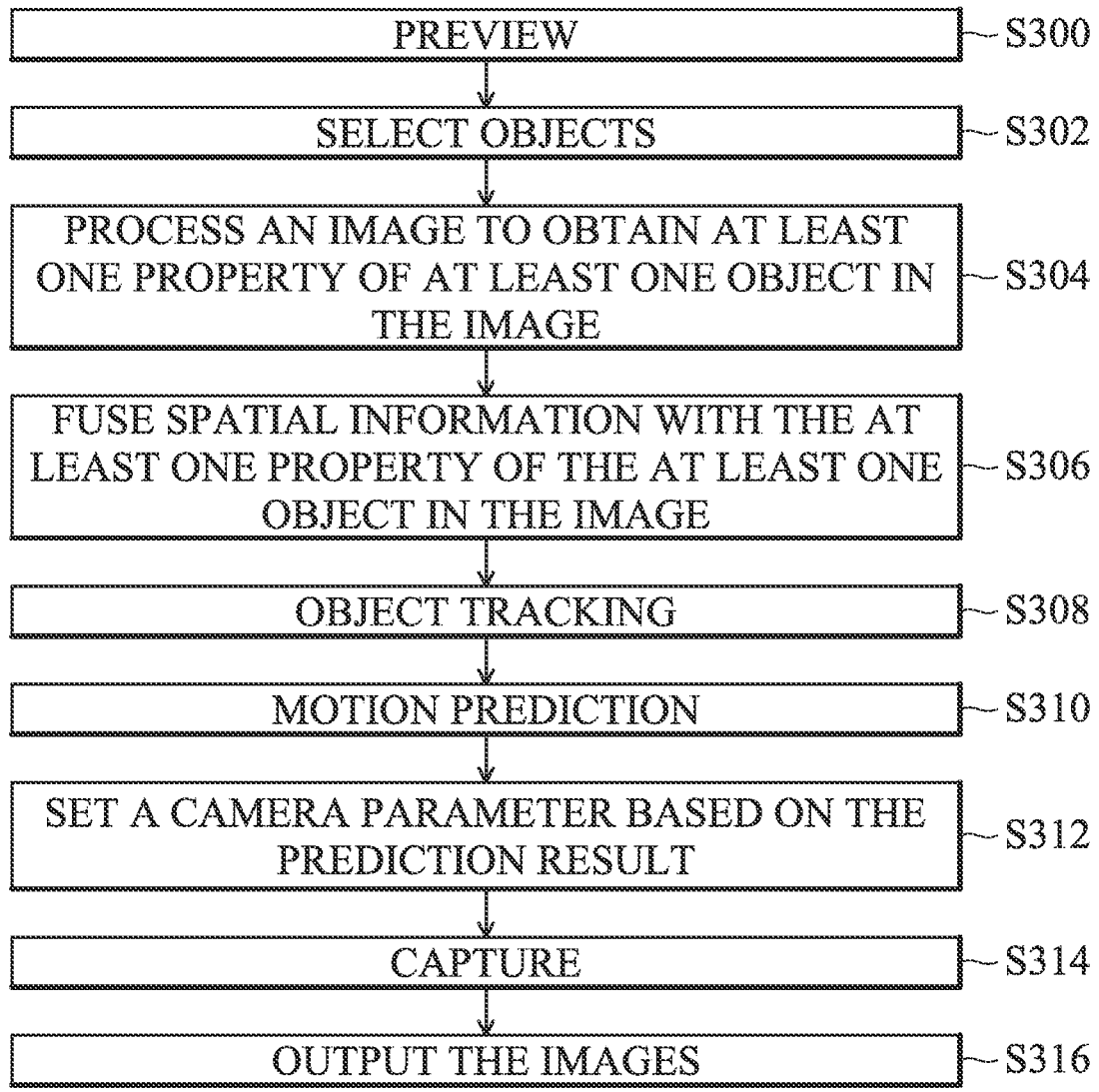
FIG. 3A is a flow chart of a method of the first application in FIG. 2 in accordance with some embodiments of the present invention.

FIG. 3A is a flow chart of a method of the first application in FIG. 2 in accordance with some embodiments of the present invention. As shown in step S300, the method for motion prediction of the present invention first previews the spatial information (such as positions, velocities, and frame-level confidence indicators) received from the radio-wave sensor and the image received from the camera. After that, in step S302, the method of the present invention selects the object 200 by marking the mark frame 210. In step S304, the method of the present invention processes the image to obtain at least one property of the object 200 in the mark frame 210 of the image. In detail, the method of the present invention constructs a 4 or higher-dimensional point cloud (for example, the point clouds 200' and 202') based on the position, velocity and additional properties, such as acceleration, of the objects 200 and/or 202. In step S306, the method of the present invention fuses spatial information with the at least one property of the object 200 in the image. In detail, the method of the present invention fuses the high-dimensional point cloud with the image processing result (for example, the mark frame 210 in the image captured by the camera). That is, the method of present invention takes the high-dimensional point cloud and the image processing result into account at the same time for object tracking. In step S308, the method of the present invention tracks the object 200 to obtain a tracking result according to both point clouds 200' and 202' and the mark frame 210. In detail, the method of present invention tracks each object (such as the objects 200 and 202) in the image to obtain the tracking result of each object according to the mark frame 210 and the point clouds 200' and 202. In some embodiments, the method of the present invention fuses spatial information with the at least one property of the object 200 in the image based on weights between spatial information and the at least one property of the object 200 in the image. For example, at a low light condition where camera images are impaired, the spatial information detected by the radio-wave sensor would get higher weights. On the other hand, if the at least one property of the object 200 in the image is strongly associated with colors and contents that the radio-wave sensor has no ability to detect such information, the image tracking result gets higher weights. If the boundaries of physical object have unnatural movement, the spatial information detected by the radio-wave sensor would get higher weights. The unnatural movement may include, for example, a sudden change in moving directions, which is more often to happen in the image. In some embodiments, the method of the present invention fusing the high-dimensional point cloud with camera, and AI algorithm can further enhance the performance and recognition rate of object detection and tracking. In addition, signal power and spectral shape detected by the radio-wave sensor can be used to (partially) identify and distinguish among objects or among different material to enhance accurate tracking. In some embodiments, the method of the present invention also executes coordinates alignment between spatial information from the radio-wave sensor and image-based detection.

In step S310, the method of the present invention predicts a motion trajectory of the object 200 based on the tracking result to obtain a prediction result. In step S312, the method of the present invention sets at least one of camera parameters and image parameters based on the prediction result. In some embodiments, the camera parameters include at least one of a shutter timing, a shutter speed, and a focal length of the camera. In some embodiments, the image parameters are dedicated for image processing. In some embodiments, the image parameters can be used for camera photographing and object focusing, which are capable of capturing the object all the time for subsequent processing. For example, the method of present invention adjusts the position and size of the image captured by the camera according to the information about the depths and the directions of the two objects in the image, to avoid tracking the wrong object among the two objects. Then, in step S314, the method of the present invention captures a final image based on the setting of the camera parameters and the image parameters. Finally, in step S316, the method of the present invention outputs the final image.

Figure 3B:
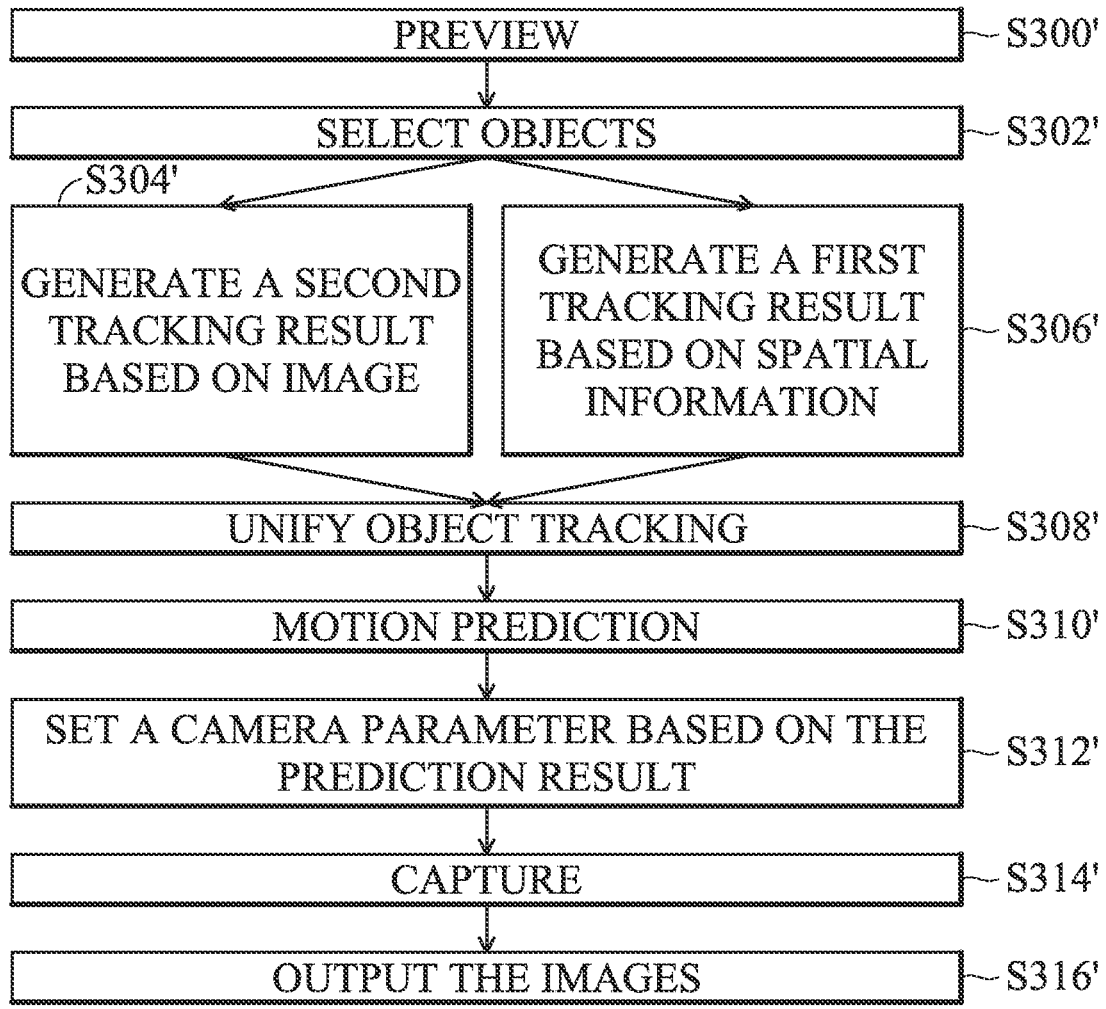
FIG. 3B is a flow chart of the other method of the first application in FIG. 2 in accordance with some embodiments of the present invention.

FIG. 3B is a flow chart of the other method of the first application in FIG. 2 in accordance with some embodiments of the present invention. As shown in step S300', the method for motion prediction of the present invention first previews the spatial information (such as positions, velocities, and frame-level confidence indicators) received from the radio-wave sensor and the image received from the camera. After that, in step S302', the method of the present invention selects the object 200 by marking the mark frame 210. In step S306', the method of the present invention generates a first tracking result based on the spatial information. In detail, the method of the present invention constructs a 4 or higher-dimensional point cloud (for example, the point clouds 200' and 202') based on the position, velocity and other properties of the objects 200 and/or 202, and tracks the object 200 to obtain the first tracking result. At the same time, in step S304', the method of the present invention generates a second tracking result based on the image. In detail, the method of the present invention determines an image processing result based on the image (for example, the mark frame 210) and tracks the object 200 based on the image processing result to obtain the second tracking result. Furthermore, in step 308', the method of the present invention unifies the first tracking result and the second tracking result to obtain the consolidated tracking result.

In step 308', the method of the present invention sets weights of the first tracking result and the second tracking result based on at least one of the spatial information and the image; and selects one of the first tracking result and second tracking result with the higher weight as the consolidated tracking result. For example, if the first tracking result is weighted higher than the second tracking result because the latter doesn't follow the common physics, the first tracking result is selected. If the weight of the second tracking result is higher because of, for example, the additional image content recognition, it is selected.

In step S310', the method of the present invention predicts a motion trajectory of the object 200 based on the tracking result to obtain a prediction result. In step S312', the method of the present invention sets at least one of camera parameters and image parameters based on the prediction result. In some embodiments, the camera parameters include at least one of a shutter timing, a shutter speed, and a focal length of the camera based on the prediction result. In some embodiments, the image parameters are dedicated for image processing. Then, in step S314', the method of the present invention captures a final image using the camera based on the setting of the camera parameters and the image parameters. Finally, in step S316', the method of the present invention outputs the final image.

Figure 4:
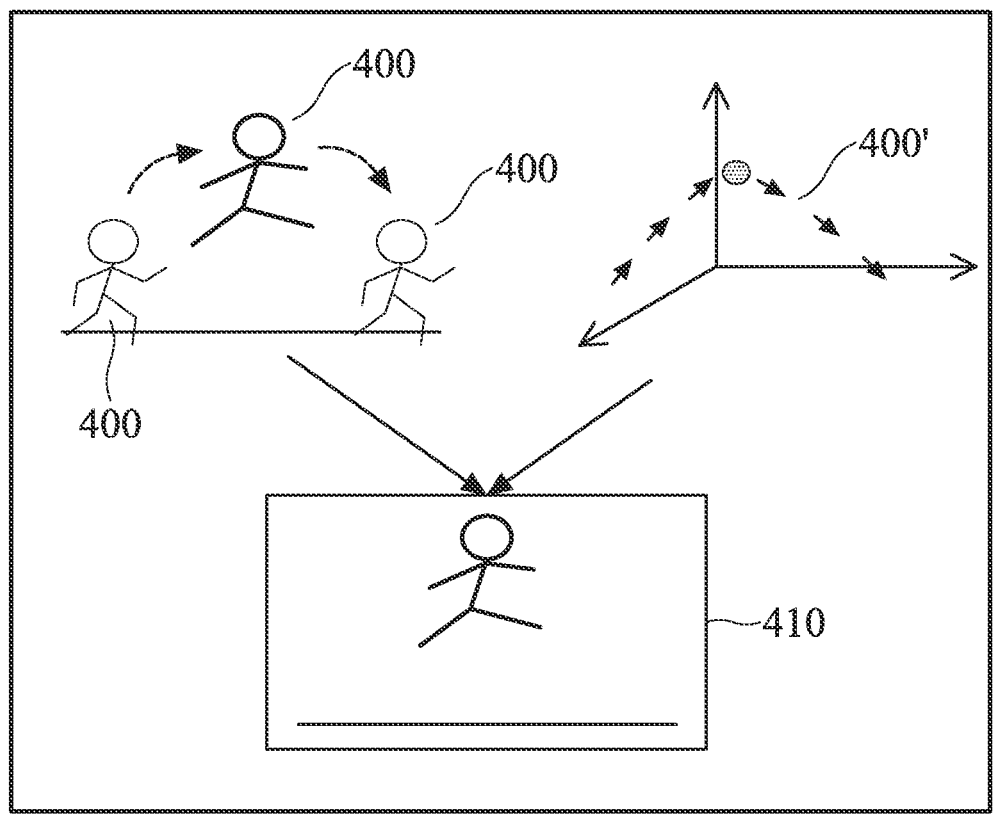
FIG. 4 is a schematic diagram of a second application of the method in FIG. 1 in accordance with some embodiments of the present invention.

FIG. 4 is a schematic diagram of a second application of the method in FIG. 1 in accordance with some embodiments of the present invention. As shown in FIG. 4, an object 400 runs on the ground from the left to the right and jumps up and down. In some embodiments, the image with the object 400 on the left of FIG. 4 is captured by a camera. The image is identified by Artificial Intelligence (AI), Machine Learning (ML) content detection, or computer vision (CV). In some embodiments, point cloud 400' on the right in FIG. 4 represents the motion trajectory of the object 400 detected by a radio-wave sensor. Since AI, ML content detection or CV is relatively slow and cannot accurately detect the highest position of the object 400 alone during the jumping, the point cloud 400' based on the spatial information from the radio-wave sensor can assist to detect or predict the highest position of the object 400, so that an image 410 with the object 400 at the highest position when jumping can be captured by the camera. The flow chart of the method of the second application in FIG. 4 is the same as the flow charts described in FIG. 3A and FIG. 3B, therefore the present invention may not describe again.

Figure 5:
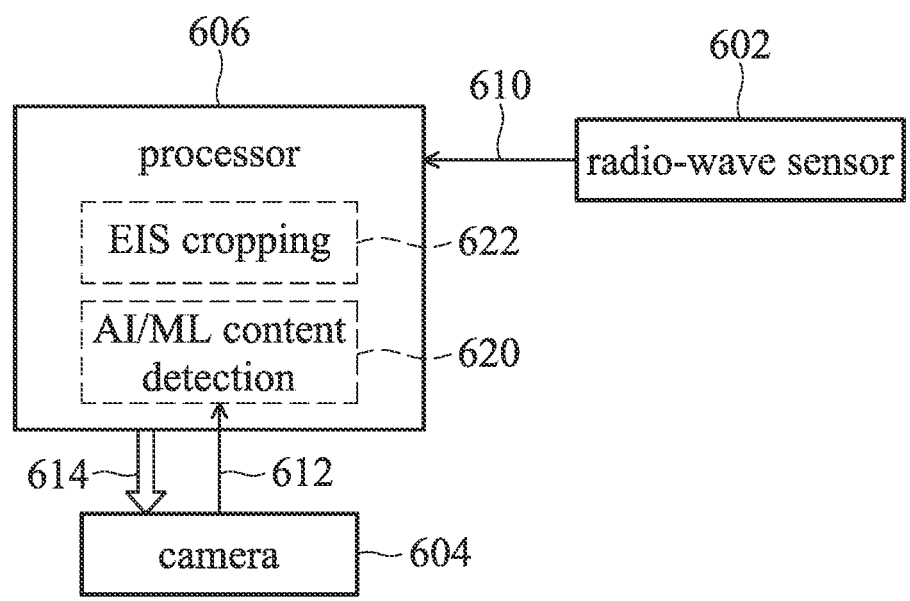
FIG. 5 is a schematic diagram of an electronic device 600 in accordance with some embodiments of the present invention.

FIG. 5 is a schematic diagram of an electronic device 600 in accordance with some embodiments of the present invention. The electronic device 600 may be a smart phone, a laptop, and a tablet, but the present invention is not limited thereto. The electronic device 600 includes a radio-wave sensor 602, a camera 604, and a processor 606. In some embodiments, the radio-wave sensor 602 provides spatial information 610 including position and velocity of at least one point. The spatial information further includes a frame-level confidence indicator. The frame-level confidence indicator is determined based on the stability of the signal power level of the reflected wave received by the radio-wave sensor within a frame. In some embodiments, the radio-wave sensor 602 may be a pulse radar, a chirp radar, a frequency modulated continuous wave radar, but the present invention is not limited thereto.

The camera 604 captures and provides an image 612. The processor 606 receives the spatial information 610 including the position and velocity of the foreground object, background and so on. In the scene, the processor 606 receives the image 612 captured by the camera 604, tracks at least one object/background based on the spatial information 610 and the image 612 to obtain a consolidated tracking result. The processor 606 predicts a motion trajectory of the object and background based on the tracking result to obtain a prediction result, and controls the camera 604 (for example, through a control signal 614) according to the prediction result. In some embodiments, the processor 606 executes AI/ML content detection 620 on the image 612 from the camera 604 to detect objects in the image 612. In some embodiments, the processor 606 executes EIS cropping 622 which reduces the image size to maintain the visual stability based on the spatial information 610 and the image 612 captured by the camera 604.

In some embodiments, tracking the at least one object based on the spatial information 610 and the image 612 by the processor 606 may include processing the image 612 to obtain at least one property of the at least one object in the image 612; and fusing the spatial information 610 with the at least one property of the at least one object in the image 612 to obtain the tracking result. In some other embodiments, tracking the at least one object based on the spatial information 610 and the image 612 by the processor 606 may include generating a first tracking result based on the spatial information 610; generating a second tracking result based on the image 612; and unifying the first tracking result and the second tracking result to obtain the consolidated tracking result. Specifically, the processor 606 sets weights of the first tracking result and the second tracking result based on at least one of the spatial information 610 and the image 612, and selects one of the first and second tracking result with the higher weight as the consolidated tracking result.

Figure 6:
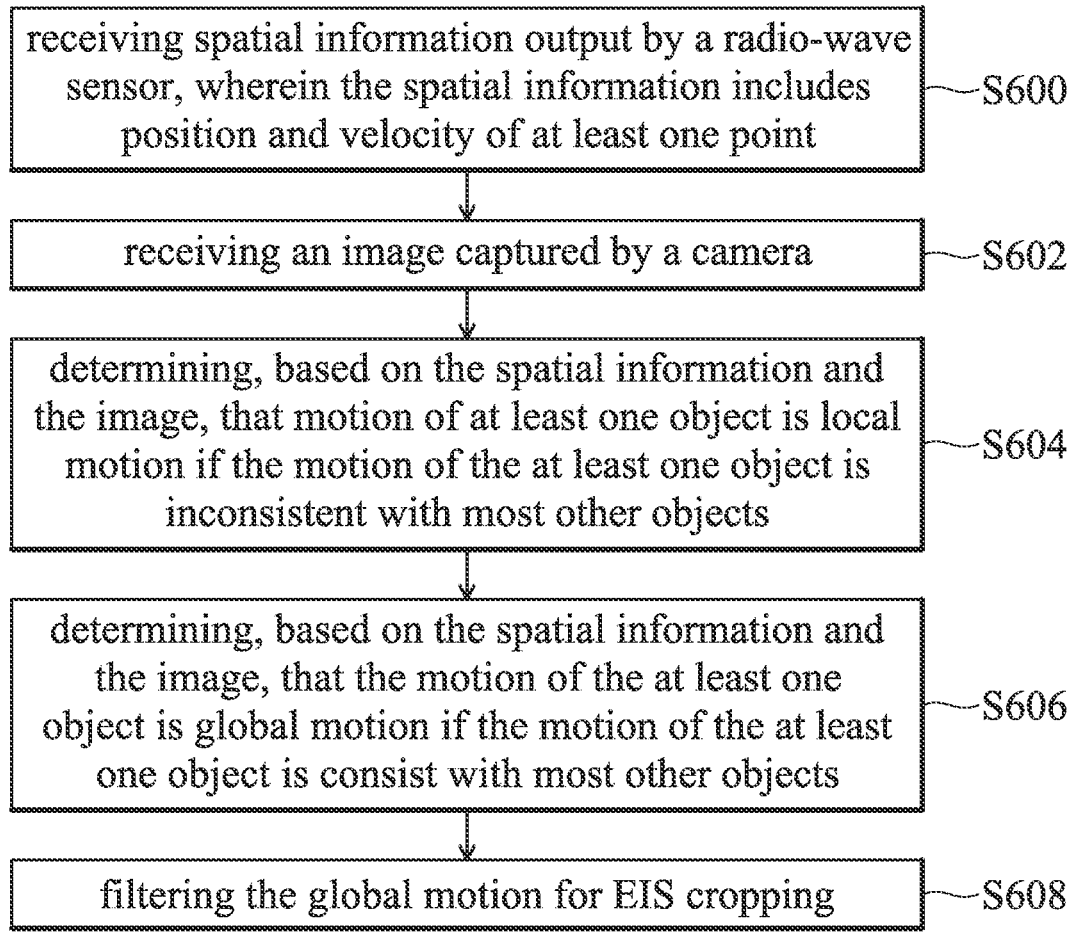
FIG. 6 is a flow chart of a method for EIS cropping in accordance with some embodiments of the present invention.

FIG. 6 is a flow chart of a method for EIS cropping in accordance with some embodiments of the present invention. The method for EIS cropping of the present invention may include receiving spatial information output by the radio-wave sensor 602, wherein the spatial information 610 includes position and velocity of at least one point (step S600), or patterns of motion; receiving an image 612 captured by the camera 604 (step S602); determining, based on the spatial information 610 and the image 612, that the motion of at least one object is local motion if the motion of the at least one object is inconsistent with most other objects (step S604); determining, based on the spatial information 610 and the image 612, that the motion of the object is global motion if the motion of the at least one object is consistent with most other objects (step S606); filtering the global motion for EIS cropping (step S608); and providing the motion of the at least one object to processor 606 for EIS procession/cropping.

For example, when the processor 606 detects a large plane (such as a wall) is moving up and down in a short period of time with a particular jittering pattern based on spatial information 610 of the target, the processor 606 determines that the moving of the large plane is unlikely possible. Therefore, the processor determines that the large plane is the global motion, so that the EIS cropping 622 filters the motion of the large plane.

In some embodiments, actuating and controlling the camera 604 with the processor 606 according to the final tracking result may include setting the shutter timing, shutter speed and focal length of the camera based on the result of motion prediction; and capturing and outputting a final image. In some other embodiments, actuating and controlling the camera 604 using the processor 606 according to the final tracking result may include setting the shutter speed, focal length, and exposure time delay of the camera based on the motion prediction, the expected position of the object is updated continuously in a prediction phase; and capturing and outputting an in-between image.

There are several advantages of the method and the electronic device 600 of the present invention as follows, 1) inherent 4D/5D/6D point cloud and object tracking enables real-time accurate object detection, tracking and motion prediction; 2) able to capture the key moment(s) at high quality with adaptive 3A control; 3) avoid hijacking, centralization, drifting and losing focus; 4) multiple points per object, that can be independently tracked for better focus; 5) support image stabilization; 6) insensitive to color, lighting and other environment impacts; 7) wide velocity detection range (high/low velocity are challenging for image processing); 8) wide FoV for better motion prediction; 9) long distance detection; 10) lower system (computing) power consumption; 11) fast processing speed; 12) small size and no hole opening for non-metallic material (for example, on a smart phone).

In advantage 2) described above, the 3A control means auto-focus, auto-exposure and auto white balance. In advantage 3) described above, the hijacking is a phenomenon that the tracking algorithm cannot tell two objects with similar characteristics (e.g. having the same colors) when the two objects come close or cross each other. In advantage 3) described above, the centralization is a phenomenon, similar to the hijacking, that the tracking algorithm cannot tell two objects with substantially similar characteristics when the two objects are occluded or partially occluded. In advantage 3) described above, the drifting is a phenomenon the tracking results show a drift in time and space from the reality when the captured images or videos do not contain "key moment(s)".

For example, the steps S100~S106 in FIG. 1, the steps S304~S310 in FIG. 3A, the steps S304'~S306' in FIG. 3B can achieve effects of advantages 1), 2), 3), 4), 6), 7), 8), 9) and 10) due to the physical characteristics of the radio-wave sensor and the spatial information obtained from the radio-wave sensor. Since the data size for processing spatial information from the radio-wave sensor is much less than that for image processing, advantage 11) can be achieved. Since the size of chip packaging for radio-wave sensor is really small, advantage 12) can be achieved. The steps S600~S608 in FIG. 6 can achieve the effect of advantage 5) due to EIS procession/cropping with considering spatial information from the radio-wave sensor.

In the several embodiments provided by the present invention, it should be understood that the disclosed system, device, and method can be implemented using other methods. The device embodiments described above are merely illustrative, for example, the division of units is only a logical function division, and there may be other divisions in actual implementation. For example, multiple units or elements can be combined or integrated into another system, or some features may be omitted or not implemented. In addition, the displayed or discussed mutual coupling or direct coupling or communicative connecting may be indirect coupling or communicatively connecting through some interfaces, device or units, and may be in electrical, mechanical, or other forms.

In addition, the functional units in the various embodiments of the present invention may be integrated into one processing unit, or each unit may exist alone physically, or two or more units may be integrated into one unit. The above-mentioned integrated unit can be realized either in the form of hardware or in the form of a software functional unit.

Although the present invention is disclosed above in the preferred embodiment, it is not intended to limit the scope of the present invention. Anyone with ordinary knowledge in the relevant technical field can make changes and modifications without departing from the spirit and scope of the present invention. Therefore, the protection scope of the present invention shall be determined by the scope of the claims.

What is claimed is:

1. A method for motion prediction, comprising:
receiving spatial information output by a radio-wave sensor, wherein the spatial information comprises position and velocity of at least one point;
receiving an image captured by a camera;
tracking at least one object based on the spatial information and the image to obtain a consolidated tracking result;
predicting a motion trajectory of the at least one object based on the consolidated tracking result to obtain a prediction result; and
controlling the camera according to the prediction result, wherein the step of controlling the camera according to the prediction result comprises:
setting at least one of camera parameters and image parameters based on the prediction result; and
capturing a final image based on the set camera parameters and the set image parameters, wherein the camera parameters include at least one of a shutter timing, a shutter speed, and a focal length of the camera, and wherein the image parameters include coordinates, depth distance, velocity, and acceleration of the at least one object.

2. The method as claimed in claim 1, wherein the spatial information further comprises a frame-level confidence indicator.

3. The method as claimed in claim 2, wherein the frame-level confidence indicator is determined based on a stability of a signal power level of a reflected wave received by the radio-wave sensor within a frame.

4. The method as claimed in claim 1, wherein the step of tracking the at least one object based on the spatial information and the image to obtain the consolidated tracking result comprises:
processing the image to obtain at least one property of the at least one object in the image;
fusing the spatial information with the at least one property of the at least one object in the image to obtain the consolidated tracking result.

5. The method as claimed in claim 4, wherein the at least one property of the at least one object in the image is obtained by processing the image using at least one of Artificial Intelligence (AI), Machine Learning (ML) content detection and computer vision (CV).

6. The method as claimed in claim 1, wherein the camera parameters comprise at least one of a shutter timing, a shutter speed and a focal length of the camera based on the prediction result; wherein the image parameters are dedicated for image processing.

7. The method as claimed in claim 1, wherein the step of tracking the at least one object based on the spatial information and the image to obtain the consolidated tracking result comprises:

generating a first tracking result based on the spatial information;

generating a second tracking result based on the image; and unifying the first tracking result and the second tracking result to obtain the consolidated tracking result.

8. The method as claimed in claim 7, wherein the step of unifying the first tracking result and the second tracking result comprises:

setting weights of the first tracking result and the second tracking result based on at least one of the spatial information and the image; and selecting one of the first and second tracking results with the higher weight as the consolidated tracking result.

9. The method as claimed in claim 1, wherein the spatial information further comprises acceleration of the at least one point.

10. An electronic device, comprising:

a radio-wave sensor, configured to provide spatial information including position and velocity of at least one point;

a camera, configured to provide an image;

a processor, configured to execute the following steps:

receiving the spatial information including the position and velocity of the at least one point;

receiving the image captured by the camera;

tracking at least one object based on the spatial information and the image to obtain a consolidated tracking result;

predicting a motion trajectory of the at least one object based on the tracking result to obtain a prediction result; and controlling the camera according to the prediction result, wherein the processor is configured to control the camera according to the prediction result, comprising:

setting at least one of camera parameters and image parameters based on the prediction result; and capturing a final image based on the set camera parameters and the set image parameters, wherein the camera parameters include at least one of a shutter timing, a shutter speed, and a focal length of the camera, and wherein the image parameters include coordinates, depth distance, velocity, and acceleration of the at least one object.

11. The electronic device as claimed in claim 10, wherein the spatial information further comprises a frame-level confidence indicator; and the frame-level confidence indicator is determined based on a stability of a signal power level of a reflected wave received by the radio-wave sensor within a frame.

12. The electronic device as claimed in claim 10, wherein the processor is configured to track the at least one object based on the spatial information and the image to obtain the consolidated tracking result, comprising:

processing the image to obtain at least one property of the at least one object in the image;

fusing the spatial information with the at least one property of the at least one object in the image to obtain the consolidated tracking result.

13. The electronic device as claimed in claim 12, wherein the at least one property of the at least one object in the image is obtained by processing the image using at least one of Artificial Intelligence (AI), Machine Learning (ML) content detection and computer vision (CV).

14. The electronic device as claimed in claim 10, wherein the processor is configured to track the at least one object based on the spatial information and the image to obtain the consolidated tracking result, comprising:

generating a first tracking result based on the spatial information;

generating a second tracking result based on the image; and unifying the first tracking result and the second tracking result to obtain the consolidated tracking result.

15. The electronic device as claimed in claim 14, wherein the processor is configured to unify the first tracking result and the second tracking result to obtain the consolidated tracking result, comprising:

setting weights of the first tracking result and the second tracking result based on at least one of the spatial information and the image; and selecting one of the first and second tracking results with the higher weight as the consolidated tracking result.

16. The electronic device as claimed in claim 10, wherein the camera parameters comprise at least one of a shutter timing, a shutter speed and a focal length of the camera based on the prediction result; wherein the image parameters are dedicated for image processing.

* * * * *